United States Patent [19]

Sendor

[11] 3,972,764
[45] Aug. 3, 1976

[54] PLASTIC BOOK COVER AND METHOD OF MAKING

[75] Inventor: Mortimer S. Sendor, Queens Village, N.Y.

[73] Assignee: Bookwrights, Inc., Scarsdale, N.Y.

[22] Filed: Sept. 13, 1974

[21] Appl. No.: 505,542

Related U.S. Application Data

[63] Continuation of Ser. No. 284,349, Aug. 28, 1972, abandoned.

[52] U.S. Cl............................. 156/243; 11/2; 156/246; 156/500; 264/212; 427/286
[51] Int. Cl.² .................. B29D 7/02; B29D 9/08
[58] Field of Search .......... 156/242, 243, 246, 277, 156/499, 500, 501; 264/212, 213, 214; 117/43, 45; 118/77, 211, 216, 217, 221, 223, 255; 11/2; 425/91, 92, 105, 517, 518, 115, 224, 328; 427/286

[56] References Cited
UNITED STATES PATENTS

| 1,998,866 | 4/1935 | Fowler | 156/243 |
| 2,929,735 | 3/1960 | Field et al. | 117/43 |
| 3,266,966 | 8/1966 | Patchell | 156/243 |
| 3,704,164 | 11/1972 | Travis | 117/43 |
| 3,818,861 | 6/1974 | Turner | 118/221 |

Primary Examiner—Caleb Weston
Attorney, Agent, or Firm—Sandoe, Hopgood & Calimafde

[57] ABSTRACT

An improved method of making hard and semi-rigid book covers, and the product obtained, provides a multi-layer plastic book with any desired ratio of flexibility to stiffness in the different parts of the cover such as the front and back panels, the hinge lines and the backbone panel that connects the front and back panels. A first layer of plastic is cast or extruded on a casting paper or belt or other supporting surface, and additional plastic material is applied to the first layer over areas that will form the front and back panels, and to the backbone area if the desired cover is one that is to have a stiffened backbone panel. A second layer is applied under conditions that insure a highly effective bonding and freedom from distortion when a curing step is necessary. The operation is continuous and the laminate formed is severed into separate covers as it is delivered from the laminating operation.

3 Claims, 13 Drawing Figures

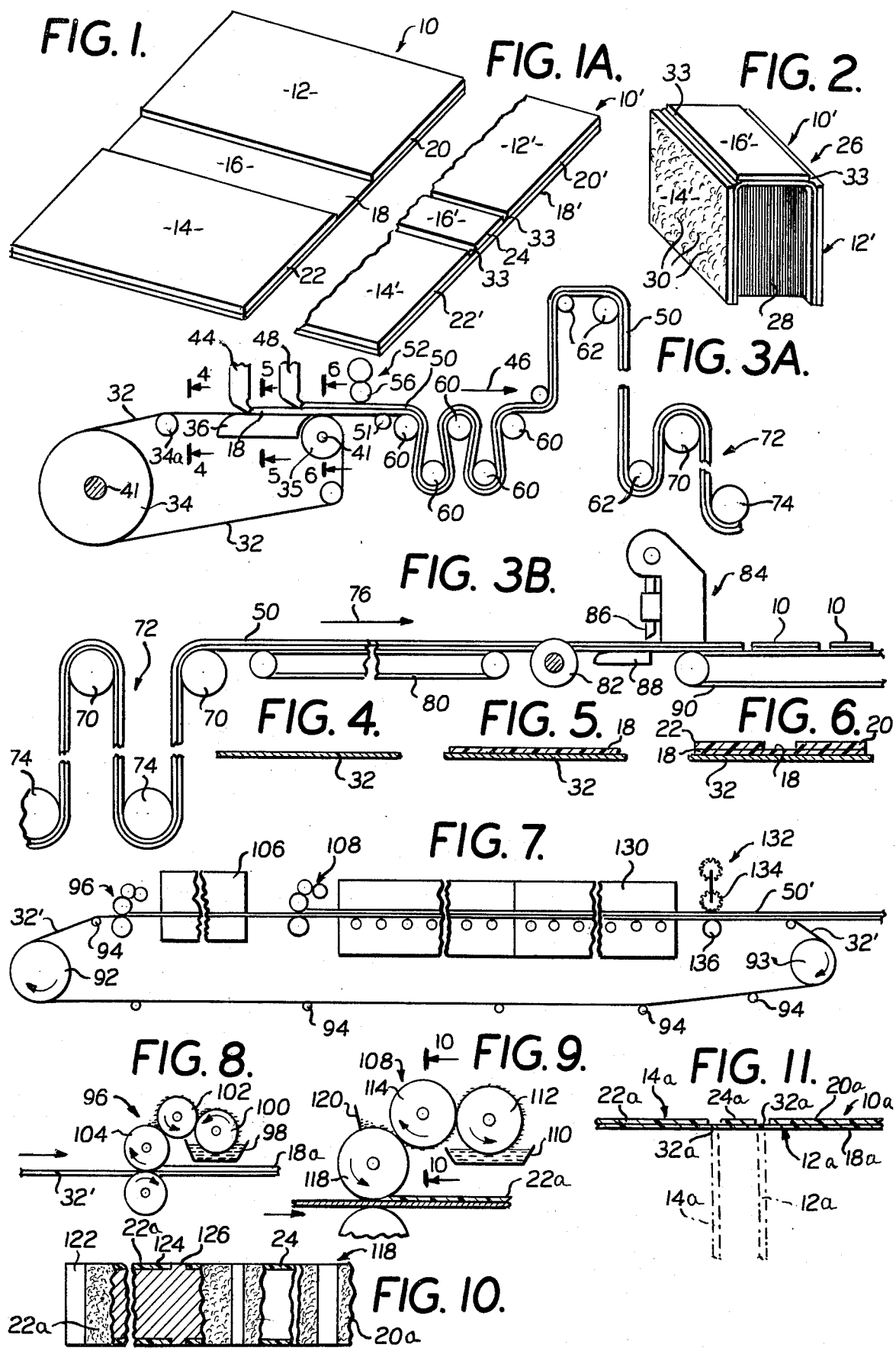

PLASTIC BOOK COVER AND METHOD OF MAKING

RELATED APPLICATION

This application is a continuation of my application Ser. No. 284,349, filed Aug. 28, 1972, now abandoned for PLASTIC BOOK COVER AND METHOD OF MAKING.

BACKGROUND AND SUMMARY OF THE INVENTION

Covers made in accordance with this invention each consist of a front panel and a back panel joined by an intermediate backbone panel for covering the front, back and backbone, respectively, of a book. Each cover is formed by a relatively thin flexible base sheet of plastic material which has another layer or layers of plastic at least on the portions defining the front and back panels and alternately also on the backbone portion, to stiffen these portions.

The flexibility of the base layer enables the front and back panels to swing on the backbone portion for opening and closing the book. If the backbone portion of the cover is also provided with a thickening layer to stiffen it, spaces left between the edges of panel-thickening layers and the adjacent edges of the backbone thickening layer provide hinge lines therebetween.

The first and second layers can be extruded with the second layer applied to the first layer while the first layer is semi-molten or at a temperature that insures a substantial welding of one layer to the other. Alternatively, the first layer can be applied to a casting paper or belt by a coater such as a reverse roll coating means with plastisol or other plastic material coming from a supply trough. The base layer can be gelled on the casting surface and then additional material can be applied selectively to portions of the base layer by a metering roll or other apparatus that will supply a second stiffening layer locally to those areas of the first layer that are to be the front and back panels, and the backbone panel, if desired.

If the plastic material supplied by the first applicator is a plastisol, an oven, and preferably a two-stage oven, is used to gel the plastisol before passing it to the next "coating" station. The composite is then cured. Where the material is to be decorated on either surface of the cover, the material is passed through an embossing or contouring roll pass while the material is still warm enough to be permanently deformed in accordance with the contour of the embossing roll.

In describing the invention, the plastic material will be said to be applied in a "fluid state", this expression being used herein to designate polymeric materials or compositions including material such as plastisols, which are non-solid; and also high viscosity fluids of a consistency such as a molten or semi-molten and bondable extrudate.

THE PRIOR ART

Plastic bookcovers of the two-layer type are known and a method of manufacturing them is disclosed in U.S. Pat. No. 3,168,424, dated Feb. 2, 1965. As disclosed therein, the book covers are formed by flowing the thickening plastic material onto a previously formed web of plastic material which provides the flexible base layer. The thickening material is flowed on in parallel strips corresponding in width to the width desired for the front and back panels, respectively, of the cover; and for the backbone panel, if the backbone panel is to be stiffened. The strips are spaced apart to provide hinge lines between the panels and on which the front and back panels can swing when opening and closing the book. The web is heated sufficiently for the stiffening material to become bonded to the underlying previously formed web and the composite web is cut into lengths corresponding to the height of the book covers to be formed.

This method of the prior art does not give the effective bond of the present invention, nor does it provide the same choice of materials. For example, unless the base sheet of the prior art is cast, and such sheets involve added cost, the prior art method cannot be used with a two-layer material that requires curing because of distortion of the base layer when subject to the heat of a curing oven. The present invention can be used with polyvinyl chloride which has the advantage that it can be used with dielectric heat.

The present invention greatly reduces the necessary inventory of the cover maker. Different thickenesses of the base layer can be obtained by merely adjusting an extruder die or coater, and no stock of preformed sheets of different thickness is necessary to obtain different thickness for the hinge lines. Change in color, thickness, stiffness and pattern can be easily obtained without carrying any inventory of preformed sheets of different colors, thickness and stiffness.

Other features and advantages of the invention will appear or be pointed out as the description proceeds.

BRIEF DESCRIPTION OF DRAWING

In the drawing forming a part hereof, in which like reference characters indicate corresponding parts in all the views:

FIG. 1 is an isometric view showing a cover, made in accordance with this invention, with the cover in open position;

FIG. 1A is a fragmentary view of a cover, such as shown in FIG. 1, but with stiffening material applied to the backbone panel;

FIG. 2 is an isometric view of the cover shown in FIG. 1 with a filler in the cover and showing a completed book;

FIGS. 3A and 3B are a diagrammatic side elevation of the apparatus used for making the covers of this invention;

FIGS. 4, 5 and 6 are sectional views taken on the lines 4—4, 5—5, and 6—6, respectively of FIG 3A;

FIG. 7 is a diagrammatic view showing a modified form of the construction which is illustrated in FIGS. 3A and 3B;

FIGS. 8 and 9 are enlarged, diagrammatic views of the applicators shown in FIG. 7 for applying the first and second layers of plastic to a casting surface;

FIG. 10 is a fragmentary view, partly in section, taken on the line 10—10 of FIG. 9; and FIG. 11 is a sectional view through the modified form of cover shown in FIG. 1A, and illustrating the way in which the front and back panels hinge to close the book to which the cover is applied.

DESCRIPTION OF PREFERRED EMBODIMENT

FIG. 1 shows a book cover 10 including a front panel 12, a back panel 14 and an intermediate backbone panel 16 which connects the front and back panels 12 and 14, respectively. The cover is made of a first layer 18 of plastic material which has the desired stiffness for the hinge lines of the cover; that is, the lines at which the front and back panels swing with respect to the backbone panel when the book opens and closes. The front and back panels 12 and 14 include a second layer 20 and 22, respectively, which stiffen the front and back panels to make them hard covers or semi-rigid covers or whatever other degree of stiffness is desired.

FIG. 1A shows a cover 10' which is the same as the cover 10 except that the backbone panel is stiffened. In FIG. 1A parts corresponding to the parts in FIG. 1 are designated by the same reference characters with a prime appended and the backbone panel 16' is made with a second layer 24 bonded to the first layer 18'. Whether or not a stiffening layer 28 is used with the backbone panel depends upon the type of binding to be used and whether the cover is to be a tight-back cover or not.

FIG. 2 shows a book 26 to which the cover 10' is applied. The cover has been applied to a filler 28 with the backbone panel 16' adhered to the backbone of the filler 28 to make a tight back book. The front and back panels 12' and 14' are decorated by embossing or other surface treatment indicated by the reference character 30. This is shown on the back cover 14', the surface of the front cover 12 not being visible in FIG. 2. In FIG. 2 the book is shown with the cover closed and the hinge lines are indicated by the reference character 32.

FIGS. 3A and 3B show the way in which the covers of FIG. 1 and 1A are made. An endless steel belt 32 passes around rolls 34, 34a and 35 supported by suitable axles. This belt 32 passes across a support. Axles 41 of rolls 34–35 are rotated by a motor or other means at a suitable speed.

The first layer of plastic material 18 is extruded on the belt 32 with the width of the extruder 44 wide enough to deposit a layer of plastic which is equal to the desired width of the book cover; that is, the panels 12, 14 and 16.

The thickness of the first layer 18 depends upon the rate at which the material is extruded from the extruder 44.

Beyond the extruder 44 and in the direction in which the belt 32 is travelling, there is a second extruder 48 which applies the second layer of plastic material in the form of independent strips such as the strips 20 and 21 of FIG. 1 or the strips 20', 22' and 24' of FIG. 1A. These strips of the second layer are continuous in the direction of the length of the belt 32, and are separated from one another by the panel 16 of FIG. 1 if there is to be no stiffening of the backbone panel 16, or by the hinge lines 33 if the backbone panel is to be stiffened as shown in FIG. 1A.

The extrudate from the extruder 44 is still in fluid state, as defined herein, when the extrudate from the second applicator or extruder 48 is applied to the first layer. Thus the extruded materials are in a condition to bond with one another by a fusion bond or what may be considered a welding together of the first and second layers to form a one-piece cover.

Immediately beyond the support 36, the combined layers of plastic material, designated as a web 50, passes through a nip roll pass 51 as a station 52 to enhance bonding of the layers 18, 20 and 22; and this roll pass 51 may be used as a surface decorating station consisting of a roll 56 which may be a chilled metal embossing roll, or more generically a contoured decorating roll which displaces the material on the outside surface of the cover to provide a grained effect or other decorative surface treatment. There is a back-up roll 54, which may be of rubber or similar elastomeric material located below the web 50. In order to provide different surface treatment for different covers, the roll 56 may be part of a turret embosser.

The web 50 travels around a series of cooling rolls 60 known in the industry as "cooling cans".

Beyond the cooling rolls 60 the web passes over idler rolls 62 and then passes around a first roll 70 of a festoon or slack accumulator 72. The beginning of the slack accumulator 72 is shown at the right hand end of FIG. 3A and a continuation of the illustration of the slack accumulator 72 is shown in FIG. 3B. A festoon or slack accumulator has a plurality of rolls 70 and 74 located at the top and bottom of the accumulator and between which the web of material to be accumulated runs in generally parallel paths with respect to one another, first downwardly, then upwardly in succession around other rolls spaced far enough and in sufficient number to accumulate the total amount of slack desired. The lower rolls 74 move upwardly when the web is being withdrawn from the discharge end of the accumulator faster than it is being supplied to the left hand end.

When the web 50 stops beyond the right hand end of the accumulator 72, the lower rolls 54 move downwardly to accumulate the material of the web which is passing to the accumulator as the result of continuous movement of the web with the casting paper 32.

Beyond the slack accumulator 72, the web 50 travels in the direction of the arrow 76 in response to movement of an endless belt feeder 80 which operates intermittently.

The belt feeder 80 advances the web 50 across a guide roll 82 to a severing station 84. In the construction illustrated there is a shear or cut-off knife 86 which operates in conjunction with a shear block 88 to sever the web 50 into separate book covers 10 as the plastic material advances onto a conveyor 90. Any other suitable means for severing the web 50 into separate book covers can be used. As each book cover is cut from the web, the intermittent removable belt 80 advances the web for a distance equal to the desired height of a book cover and the web is then severed to make the next book cover.

FIG. 4 is a sectional view on the line 4—4 of FIG. 3A and shows the casting paper 32 before any plastic has been applied to it. FIG. 5 shows the casting paper 32 with the first layer 18 applied to the paper; FIG. 6 shows the casting paper 32 with both the first layer 18 and the second layers 20 and 22 applied to the casting paper and to each other to form a book cover such as shown in FIG. 1.

FIG. 7 is a diagrammatic showing of a modified apparatus for applying the plastic material to a travelling casting surface. In FIG. 7 an endless belt, indicated by the reference character 32' is substituted for the casting paper. This endless belt can be made of metal or any other desired material with a surface of such a character or so coated as to prevent plastic material from adhering to it. There are rolls 92 and 93 around which the belt 32' reverses its direction of travel and there are a plurality of supporting rolls 94 at different locations along the length of both top and bottom runs of the endless belt 32' for supporting the belt without excessive tension. Any suitable supports can be used.

A first layer of material 18a is applied to the endless belt 32' at a first applicator station 96. A diagrammatic showing of the construction of the applicator station 96 is shown in FIG. 8. The structure illustrated is a reverse roll coater.

The plastic material for the first layer 18a, which may be a plastisol, is supplied from a trough 98. A roller 100 dips into the trough and supplies plastic material to a transfer roller 102. A coating roller 104, which is rotated in the opposite direction to the direction in which the belt 32' travels, picks up plastic material from the transfer roll 102 and coats it on the belt 32'. Reverse roll coaters are well known and no further description of the applicator station 96 is necessary for a complete understanding of this invention. The apparatus shown in FIG. 8 is representative of means for applying a first coating 18a in liquid phase to a casting surfce such as the endless belt 32'.

Beyond the applicator station 96, the endless belt 32, with the first layer of plastic material 18a passes through a gelling oven 106 which is of the proper heat and length, in proportion to the speed of travel of the coated material 18a to gel the plastic material to a soft, semi-solid condition.

With the plastic material 18a in a gelled tacky condition, it travels past a second applicator station 108, the construction of which is illustrated diagrammatically in FIG. 9. This figure shows plastic material for a second layer 22a supplied from a trough 110. A roller 112 dips into the trough 110 and carries liquid from the trough to a transfer roller 114 which in turn contacts with a coating roller 118. This coating roller 118 rotates in the same direction of travel as the gel coat 18a, since the gel coat is not of a consistency to safely withstand the friction of a reverse roll coater.

The second coating 22a applied by the coating roller 118 is controlled by a doctor blade 120 which limits the dimensions of the plastic on the periphery of the coating roll 118, beyond the doctor blade 120, to the depressed areas of the roll 118.

Such coaters are well-known in the art so that no further description is necessary except the means for applying the layers locally.

The coating roll 118 is shown in FIG. 10. It contacts with the transfer roll 114, which is usually made of rubber, but the roll 118 has a face of reduced diameter at the portions which are to be used for coating the underlying layer 18a. For example, the roller 118 has a maximum diameter at one end represented by the circumferential area 122. There is then a depressed area 124, which may be engraved or machined and which extends to another full diameter area 126; and the space between these full diameter areas 122 and 126 holds the plastic material 22a which is to be deposited on the underlying layer 18a.

When the roller 118 receives plastic material from the transfer roll 114, the entire circumference of the roller 118 is coated with plastic material but the doctor blade 120 scrapes off all of the plastic material except that which lies in the depression 124 and in other depressed areas of similar construction which hold the plastic material for providing the second layer 24a for the backbone panel and 20a for the front cover panel.

Beyond the second applicator station 108, the endless belt 32' with its two layers of plastic material forming a web 50' passes through a curing oven 130 which is shown in FIG. 7 as a two-stage oven. Curing ovens are also well-known in the plastic manufacturing art and no detailed description of such an oven is necessary for a complete understanding of this invention.

The web 50' comes from the curing oven 130 in a hot condition and if the outside surface of the book cover is to be decorated by graining or other contour treatment, such treatment may be applied just beyond the curing oven 130 at an embossing station 132 where the web 50' is shown passing over a back-up roll 136 and in contact with the bottommost roll of a turret embosser 134.

Beyond the end of the casting surface provided by the upper run of the endless belt 32', the web 50' passes onto a severing station at which it is cut into book covers of the desired height.

FIG. 11 shows a book cover 10a made on the apparatus shown in FIG. 7. This cover has the inner or first layer 18a to which the second layer strips 20a, 22a and 24a have been applied to stiffen the front, back and backbone panels of the book. The front and back panels are shown in broken lines in the positions they occupy after the cover has been applied to a book and the front and back panels 12a and 14a swing with respect to the backbone panel 24a along hinge lines 32a and 22a.

The preferred embodiment of the invention has been illustrated and described, but changes and modifications can be made and some features can be used in different combinations without departing from the invention as defined in the claims.

What is claimed is:

1. The method of making a line of successive covers, which method comprises applying a first layer of semi-liquid plastic material, of continuous surface both lengthwise and widthwise, to a continuously travelling casting surface with the layer as wide as the combined widths of front and back panel areas and a connecting spine panel area of successive book covers that are to be made by the method, then applying a second layer of plastic locally to areas of the first layer which will be front and back panels of the book covers, the second layer being applied by passing the first layer under a coating roller that has recessed grooves in its circumference, supplying to one of the recessed grooves additional semi-liquid plastic material, for the second layer, of a width that coats the first layer and makes the front panels of the successive covers, supplying to another of the recessed grooves additional semi-liquid plastic material, for the second layer, of a width that coats the first layer and makes the back panels of the successive covers, whereby the application of said semi-liquid plastic materials to the first layer makes the front and back panels of the covers thicker and stiffer than other areas of the finished cover, and limiting the thickness of the plastic covers at hinge lines of the covers by maintaining, over the hinge line areas, uncoated circumferential surfaces of the roller that are of greater radius than the circumferential surfaces of the roller grooves.

2. The method described in claim 1 characterized by transferring semi-liquid plastic from a supply container to the coating roller, and wiping all plastic from the large radius surfaces of the coating roller before the roller coats the second layers on said localized areas of the first layer of plastic to form the front and back panels of the cover.

3. The method described in claim 1 characterized by applying a second layer of plastic to the spine panel areas of the first layer to stiffen the spine panel areas, and maintaining thinner areas for hinge lines between the spine panel areas and the cover panel area by scraping all plastic from the coating roller circumference that is adjacent to the hinge line areas and before the first layer of plastic passes the coating roller that applies said second layers.

\* \* \* \* \*